United States Patent Office 2,785,179
Patented Mar. 12, 1957

2,785,179

PROCESS FOR SEPARATING NITROGENOUS COMPOUNDS FROM MOLASSES BY MEANS OF ION EXCHANGE

Jacob van Julsingha, Amsterdam, Netherlands, assignor to N. V. Centrale Suiker Maatschappij, Amsterdam, Netherlands, a company of the Netherlands No Drawing. Application October 15, 1953, Serial No. 386,378

Claims priority, application Netherlands January 30, 1953

11 Claims. (Cl. 260—326.3)

It is known that by far the greater part of the nitrogenous compounds present in sugar juices accumulates in the cane and beet sugar molasses. Several of these compounds have considerable value, such as amino acids, e. g. glutamic acid, which are present in the form of alkali salts, and betaine.

It is natural to try to recover these compounds in ion exchangers, this treatment therefore has already been the subject of various investigations. It was thus found that indeed several valuable nitrogen compounds, such as betaine and glutamic acid, are first caught in the cation exchanger, but that, upon continued treatment, they are replaced by inorganic cations. In this way it was not possible to obtain the nitrogen compounds practically free from inorganic constituents. Certain expedients have therefore been applied. Thus two cation exchangers were placed one behind the other. In the first are initially caught the valuable nitrogen compounds, which are subsequently replaced by the inorganic cations; the liquid then flowing off is passed through a second cation exchanger; the amino acids and the like are then caught in the latter. It is also possible to charge the first cation exchanger only incompletely with the nitrogen compounds, so that they are not replaced by the inorganic ions. In both cases eluation is effected, for example, with dilute ammonia. These processes are uneconomical, while it is difficult or impossible to obtain the eluate free from ash forming materials.

To this must be added the circumstance that for the ion exchange the molasses has to be purified, since otherwise the filters will soon become clogged by substances of widely varied nature, such as pectins, proteins, mucous coupling products of sugar and amino acids.

Now a suitable method has been found for obviating the abovementioned drawbacks and separating off valuable nitrogen compounds from molasses by means of ion exchange. To this end the molasses is diluted with an organic liquid miscible with the molasses or with a mixture of such liquids, and there is added, either mixed with this organic liquid or separately, an acid whose salts with the cations present in the molasses are difficultly soluble or insoluble in the resulting mixture, the precipitate is separated from the liquid, the organic liquid is evaporated, and the remainder is passed through one or more ion exchangers.

In the first place it is necessary to dilute the molasses and this is the reason for the addition of the organic liquid. Methyl alcohol in particular is suitable, but also dilute ethyl alcohol and dilute acetone, for example, are satisfactory. The quantity of the organic liquid or of the mixture of organic liquids may vary within wide limits. In practice no more than 2 kg. of organic liquid per kg. of molasses will usually be used, since a larger quantity of that liquid does not cause the process to proceed any more satisfactorily. If too small a quantity of the organic liquid is used, the viscosity of the mixture remains too great for a subsequent treatment to separate the precipitate. By means of these data it is possible to choose the requisite quantity of the liquid to be added. In general it will suffice to add about 0.6 kg. of organic liquid per kg. of molasses; the proportion by weight of molasses to organic liquid that is preferably used is about 1:1.

Acids that may be used are, for example, sulphuric acid, sulphurous acid or phosphoric acid; for practical purposes sulphuric acid was found very suitable. The quantity of acid that is added may also vary within very wide limits. In any case the mixture should be acidified until a pH below about 6 has been attained. It is best to add such a quantity of acid that the pH is between 3.5 and 2, preferably about 3. It is quite safe to acidify to pH 1 or even lower, but this is practically useless; moreover, some amino acids might then precipitate. The end in view is to precipitate all sorts of undesirable substances, including the salts. The latter precipitate practically completely at pH$\pm$3, while other harmful substances will also sufficiently precipitate at this point.

The precipitate is separated from the liquid. This can be done by different methods, which need not be specified here, since they are sufficiently known in the art.

The precipitate formed by addition of the acid can be removed, e. g. filtered off, at ordinary temperature. It has, however, been found that the removal of the precipitate can be appreciably accelerated by causing the precipitate to form at a temperature above room temperature, or heating the liquid with the precipitate to temperatures above room temperature, then cooling approximately to room temperature, and subsequently bringing about the separation of precipitate and liquid. Even a slight heating of the liquid, or of liquid and precipitate, to, say, 30–35° C. will subsequently give rise to an appreciably increased rate of filtration. With continued raising of the temperature this rate is increased considerably more. Little is to be gained, however, by raising the temperature beyond 80° C. For practical purposes a temperature of 40–50° C. was found to be sufficient.

After the removal of the precipitate a clear, homogeneous liquid is left behind, in which, besides sugar, the various valuable nitrogen compounds are present. In any case the organic liquid is evaporated from it. It is, however, also possible first to recover more sugar from it, for example, by addition of another organic liquid (such as ethyl acetate, benzene, chloroform), in which sugar practically does not dissolve, which is miscible with the first organic liquid, and which does not flocculate molasses, at least not in the quantity in which it is added. It is also possible to apply the method mentioned in i. e. the U. S. Patent No. 2,591,704, the addition of a non-ionogenous surface-active substance, several examples of which are mentioned in the said patent.

After separation of the sugar precipitated by the addition of the second organic liquid and after the removal of the organic liquids by evaporation, a perfectly clear molasses is obtained, which, if necessary after dilution with water, can be very satisfactorily percolated through ion exchangers.

As ion exchanger it is possible, as already described in the literature, to use a cation exchanger; glutamic acid and betaine are then caught therein. The pyrrolidone-carboxylic acid can then be caught in an anion exchanger. It is, however, preferred, in contrast with the existing practice, first to use an anion exchanger. This is possible here because the organic acids have been released. In practice the liquid is preferably diluted to about 20–30 Br. and percolated directly through the anion filter. This method has the advantage that in this filter the organic acids, such as glutamic acid, pyrrolidone-carboxylic acid, and, in the case of cane sugar molasses, aconitic acid, are caught and thus separated from the betaine. The eluation may take place in the known manner, e. g. with dilute ammonia or with dilute hydrochloric acid. Thus the ammonium salts or the muriatic salts of the organic acids are obtained in solution. If pyrrolidone-carboxylic acid is present, the concentrated solution can be hydrolysed, for example, with addition of concentrated hydrochloric acid or hydrochloride.

The liquid flowing off from the anion exchanger is practically neutral. There is therefore no longer any risk of inversion of any sugar that may be present.

Preferably the liquid flowing off from the anion exchanger is passed through a cation exchanger; the betaine is then caught in the latter. This may be eluated with an acid, e. g. with dilute hydrochloric acid, or with a base, e. g. dilute ammonia. After concentration of the solution, the HCl salt of betaine or with ammonia, the betaine itself crystallizes. This has the advantage that the cations have already been removed from the mass, so that thre is no risk of the betaine being replaced by other cations.

The molasses solution flowing off has a very pale colour; it can be made perfectly colourless by a treatment with carbon or with a decolorizing resin. It may be worked up in concentrated form and as a syrup. The ash content is exceptionally low, as is also the nitrogen content. From the syrup it is also possible to recover sugar in the known manner, if this has not yet been done at an earlier stage.

Example I

Two parts by weight of beet sugar molasses with a moisture content of 23% and a sugar content of 50% are stirred together with 2 parts by weight of methyl alcohol until a perfectly homogeneous, thin mass has been obtained. 0.13 part by weight of concentrated sulphuric acid, calculated on the molasses, is slowly added with stirring; the pH of the liquid is 3. There is formed a precipitate of sulphates, mainly potassium sulphate, and also of originally more or less colloidally divided substances, such as proteins. After removal of this precipitate 0.36 part by weight of ethyl acetate is added to the clear solution, and it is inoculated with 0.010 part by weight of fine crystallized sugar, and the liquid is introduced into a crystallizing apparatus. The separated sugar, in an amount of 0.698 part by weight, is centrifuged. After the removal of the methyl alcohol and ethyl acetate by evaporation, there is then left a total quantity of about 1.16 parts by weight of the "second" molasses, with a content of dry substance of 67%. This molasses is diluted with water to about 30 Br. and percolated through an anion exchanger in which the organic acids, such as glutamic acid and pyrrolidone-carboxylic acid, are caught. The pH of the liquid before the percolation is 2.4 and after the percolation 6.9.

The anion exchanger is eluated with dilute hydrochloric acid; the eluate contains all the organic acids. The solution is evaporated. Concentrated hydrochloric acid is added, and the mixture is refluxed for 6 hours in order to open the pyrrolidone ring and convert the compound in question into glutamic acid. Then the mixture is further evaporated on a water bath until a film of crystals appears on the liquid. After cooling, the glutamic acid crystallizes as muriatic salt. By continued evaporation of the mother liquor more crystals of this muriatic salt are obtained.

A total quantity of 0.052 part by weight of the pure muriatic salt of glutamic acid is obtained.

The liquid which has percolated through the anion exchanger is now passed through a cation exchanger, in which the betaine is caught. This compound is eluated with dilute hydrochloric acid; after evaporation and cooling, the betaine crystallizes as muriatic salt from the eluation liquid. After the processing of the mother liquor a total quantity of 0.064 part by weight of the compound in question has been obtained.

The liquid collected behind the cation exchanger has a very pale colour, the pH is 4.6; after neutralization with NaOH to a pH 6.5 and evaporation to 75 Br. the ash content is 0.09%, the nitrogen content 0.42%. From this syrup some more sugar can be recovered, if desired; it may, however, also be further processed as syrup.

Example II

Two parts by weight of beet sugar molasses as used in Example I are stirred together with 2 parts by weight of methyl alcohol until a homogeneous solution has been obtained. After addition of 6.5% of 96% sulphuric acid, calculated on molasses, a precipitate is formed, which is removed from the liquid.

The methyl alcohol is distilled off, and the remaining clear molasses is rapidly cooled in order to minimize inversion. The pH of the mixture is now 2.3. After dilution to about 25 Br. the molasses is first passed through an anion exchanger and subsequently through a cation exchanger. The procedure is further as described in Example I. A total quantity of 0.049 part by weight of the muriatic salt of glutamic acid and 0.068 part by weight of the muriatic salt of betaine is obtained. The clear syrup obtained behind the cation exchanger can be processed into sugar or syrup, or sugar and syrup.

Example III

Two parts by weight of beet sugar molasses as used in Example I are mixed with a mixture of 2 parts by weight of 85% ethyl alcohol and 6.3% of 96% sulphuric acid (calculated on molasses). There is formed a precipitate, mainly consisting of alkali salts and previously colloidally divided substances. This precipitate is removed, as a result of which a homogeneous liquid is obtained. The ethyl alcohol is removed from this liquid by distillation and the remaining clear molasses is percolated, after dilution with water to 25 Br., through an anion filter; the liquid flowing off subsequently passes through a cation filter.

When the procedure described in Examples I and II is applied, there is ultimately obtained 0.044 part by weight of the muriatic salt of glutamic acid and 0.060 part by weight of the muriatic salt of betaine.

The syrup ultimately obtained can be processed as in Example II.

Example IV

Five kg. of molasses are mixed with 5 kg. of methyl alcohol, and the mixture is heated to 50° C. There is added 6% by weight of concentrated sulphuric acid, calculated on molasses. Then the mixture is rapidly cooled to room temperature. The precipitate formed is then sucked off in a Büchner funnel with a filter area of 5 dm.²; the pressure below the filter is 40 cm. of mercury. The filtration time is 5 minutes. If the precipitate is formed and sucked off at room temperature, the filtration time is 15 minutes. The separation of the valuable compounds from the filtrate can take place in the same manner as described in the preceding examples.

I claim:

1. Process for the recovery of amino carboxylic acids and betaine from molasses which comprises diluting the molasses with an organic liquid chosen from the group consisting of methyl alcohol, ethyl alcohol and acetone in an amount of from 0.6 kilogram to 2 kilograms per kilogram of molasses and acidifying the resulting solution to a pH between 6 and 1 with an acid whose salts with metal ions present in the molasses are substantially insoluble in the resulting mixture, separating the resulting precipitate from liquid, removing the organic liquid by evaporation and passing the remaining solution through an ion exchanger.

2. Process as defined in claim 1 in which the solution prior to passage through the ion exchanger is diluted with water to about 20–30 Br.

3. Process as defined in claim 2 in which the diluted solution is passed first through a cation exchanger and then through an anion exchanger.

4. Process as defined in claim 2 in which the diluted solution is passed first through an anion exchanger and then through a cation exchanger.

5. Process as defined in claim 1 in which the organic liquid is methyl alcohol, the acid is sulfuric acid.

6. Process as defined in claim 5 in which the acid is added in quantity sufficient to produce a pH in the mixture of from 3.5 to 2.

7. Process as defined in claim 6 in which one part by weight of the methyl alcohol is added for each part by weight of the molasses and in which after removing the organic liquid the remaining solution is diluted with water to 20 to 30 Br. and then passed successively through a cation exchanger and an anion exchanger.

8. Process as defined in claim 6 in which one part by weight of the methyl alcohol is added for each part by weight of the molasses and in which after removing the organic liquid the remaining solution is diluted with water to 20 to 30 Br. and then passed successively through an anion exchanger and a cation exchanger.

9. Process as defined in claim 3 in which amino acids and betaine are recovered from the cation exchanger and pyrrolidone carboxylic acid is recovered from the anion exchanger.

10. Process as defined in claim 4 in which amino acids and pyrrolidone carboxylic acid are recovered from the anion exchanger and betaine is recovered from the cation exchanger.

11. Process for the recovery of amino carboxylic acids and betaine from molasses which comprises diluting the molasses with a mixture of an organic liquid chosen from the group consisting of methyl alcohol, ethyl alcohol and acetone in an amount of from 0.6 kilogram to 2 kilograms per kilogram of molasses and an acid whose salts with the metal ions present in the molasses are substantially insoluble in the resulting mixture, the acid being used in such amount that the resulting solution will have a pH between 6 and 1, separating the resulting precipitate from liquid, removing the organic liquid by evaporation and passing the remaining solution through an ion exchanger.

References Cited in the file of this patent

UNITED STATES PATENTS

| | | |
|---|---|---|
| 2,375,164 | Bennett | May 1, 1945 |
| 2,519,573 | Hoglan | Aug. 22, 1950 |
| 2,688,037 | Hoglan | Aug. 31, 1954 |
| 2,713,592 | Hoglan | July 19, 1955 |